United States Patent
Kolb

(10) Patent No.: US 9,189,938 B2
(45) Date of Patent: Nov. 17, 2015

(54) AUTOMATICALLY LOCATING FIRE ALARMS

(75) Inventor: Dieter Kolb, Germering (DE)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 14/007,561

(22) PCT Filed: Mar. 21, 2012

(86) PCT No.: PCT/EP2012/054936
§ 371 (c)(1),
(2), (4) Date: Sep. 25, 2013

(87) PCT Pub. No.: WO2012/130670
PCT Pub. Date: Oct. 4, 2012

(65) Prior Publication Data
US 2014/0015667 A1    Jan. 16, 2014

(30) Foreign Application Priority Data
Mar. 25, 2011   (DE) .......................... 10 2011 006 153

(51) Int. Cl.
*G08B 23/00* (2006.01)
*G08B 17/00* (2006.01)
*G06F 11/07* (2006.01)
*G08B 25/00* (2006.01)
*G08B 29/14* (2006.01)

(52) U.S. Cl.
CPC ............ *G08B 17/00* (2013.01); *G06F 11/0745* (2013.01); *G06F 11/0751* (2013.01); *G06F 11/0793* (2013.01); *G08B 25/003* (2013.01); *G08B 29/145* (2013.01)

(58) Field of Classification Search
CPC ... G08B 23/00; G06F 11/0745; G06F 11/221; G06F 11/0751; G06F 11/0749; G06F 11/0793
USPC ............... 340/501, 3.32; 709/217; 714/43, 49
See application file for complete search history.

(56) References Cited

U.S. PATENT DOCUMENTS

| 8,291,036 B2 * | 10/2012 | Poluri et al. ................... 709/217 |
| 8,635,499 B2 * | 1/2014 | Cohn et al. ...................... 714/43 |
| 8,825,871 B2 * | 9/2014 | Baum et al. ................... 709/227 |
| 8,836,467 B1 * | 9/2014 | Cohn et al. ................... 340/3.32 |
| 2007/0096901 A1 | 5/2007 | Seeley et al. |

(Continued)

FOREIGN PATENT DOCUMENTS

| DE | 102008058297 A1 | 6/2010 |
| DE | 102011006153.3 | 3/2011 |
| EP | 1 398 746 A1 | 3/2004 |

(Continued)

OTHER PUBLICATIONS

Office Action for German Patent Application No. 10 2011 006 153.3 dated Nov. 30, 2011.
International Search Report for PCT/EP2012/054936 dated Jul. 11, 2012.

*Primary Examiner* — John A Tweel, Jr.
(74) *Attorney, Agent, or Firm* — Staas & Halsey LLP

(57) ABSTRACT

In a building, an identification number and positioning of a fire alarm is automatically compared either in a control panel or a mobile communication device of a user to automatically locate a fire alarm. Because no manual entries are required, erroneous entries are avoided.

7 Claims, 3 Drawing Sheets

(56) References Cited

U.S. PATENT DOCUMENTS

2009/0070477 A1    3/2009    Baum et al.
2011/0221574 A1    9/2011    Eckl et al.

FOREIGN PATENT DOCUMENTS

| | | |
|---|---|---|
| GB | 2 319 373 A | 5/1998 |
| WO | 2012/045996 A1 | 4/2012 |

* cited by examiner

AUTOMATICALLY LOCATING FIRE ALARMS

CROSS REFERENCE TO RELATED APPLICATIONS

This application is the U.S. national stage of International Application No. PCT/EP2012/054936, filed Mar. 21, 2012 and claims the benefit thereof. The International Application claims the benefits of German Application No. 10 2011 006 153.3 filed on Mar. 25, 2011, both applications are incorporated by reference herein in their entirety.

BACKGROUND

Described below are methods for automatically locating a fire alarm, in particular in a building, and to a device for performing the methods.

Major buildings (office blocks, public buildings) are generally equipped with fire alarms which automatically trigger an alarm in the event of a fire. This alarm is relayed to a control center, where it indicates in which room or part of the building a fire has broken out. For that purpose it must be known in the control center which fire alarm is installed where.

Typically, every fire alarm possesses a unique identification number, e.g. a so-called MAC address (Media Access Control address), which it sends together with the reason for the alarm in its alarm message to the control center. So that the exact location of the alarm can be determined in the control center on the basis of the identification number, the engineer must record the installation location at the time that the fire alarm is installed and store the location together with the identification number e.g. in a database. Toward that end, he must read off the identification number on the fire alarm and record it in a document prior to the installation. In addition, he must record the number or name of the room, and in the case of larger rooms must also include a description of the alarm's position in the room. Often this information is recorded on paper during the installation and later, at the computer, transferred into a database. Alternatively, however, the data can also be input directly on a notebook at the time of installation. In another well-known approach, before the installation takes place, a unique identification number is allocated in a plan of the building to each designated fire alarm and entered in the plan. The allocated identification number is set on each of the individual fire alarms and the respective fire alarm is labeled accordingly. During the installation the engineer must then select and install the fire alarm designated for the respective installation site according to its labeling. In so doing he must make absolutely sure that he is installing the right fire alarm at the right location. The known methods are based on manual inputs and are therefore susceptible to error.

SUMMARY

The methods and device described below enable automatic localization of a fire alarm at the time of its installation.

A method for automatically locating a fire alarm, in particular in a building, includes:
(a) the position at which the fire alarm is installed is marked in a plan by an operator using an input device, the plan being displayed on a mobile communications device of the operator;
(b) a test message of the fire alarm to a control center is triggered by the operator, the test message including a unique identification number of the fire alarm;
(c) the control center is instructed by the operator by the mobile communications device to send the test messages that have been present at the control center for a defined period of time to the communications device, wherein, if precisely one test message is present, the unique identification number contained in the test message for the position of the fire alarm in the plan displayed on the mobile communications device can be assigned by the operator using an input device, and wherein, if more than one test message is present, a new test message of the fire alarm to the control center is triggered by the operator;
(d) the assignment of the unique identification number of the fire alarm is stored together with its position in a building management system. This results in an automatic assignment of the installation location (position) of the fire alarm to its identification number, thereby eliminating the need for a manual and hence error-prone input of the identification number. Furthermore, the amount of cost and effort involved in installing and locating the fire alarms is significantly reduced. Subsequent transfer of the data recorded on paper into the building management system is unnecessary. A building management system (BMS, Facility Management System) may be a computer-based system (e.g. computer having input/output and storage media) which, among other functions, automatically makes available, in the event of an alarm, detailed information in textual and/or graphical form for the tactical courses of action to be taken at the alarm location (e.g. scene of accident in the building) for emergency services, but also for occupants or for employees in an office block (e.g. by loudspeaker announcements or on monitors). A building management system supports the operator of the facility or a third party contractually mandated to manage its operation, in particular in executing their planning tasks and legal safety and security obligations.

According to a first advantageous embodiment, the test message is triggered and the control center instructed by a single action on the part of the operator. This increases the efficiency of the method (e.g. reduction in installation time).

According to a further advantageous embodiment, the triggering of the test message additionally activates a localization system which determines the position of the fire alarm and communicates same to the mobile communications device. The position of the fire alarm can be determined automatically by the localization system, thus avoiding input errors when specifying the position.

The method for automatically locating a fire alarm in a building, the building being equipped with a localization system also may include:
(a) the localization system is activated by an activation device as a result of the latter's action on the fire alarm by an operator, the localization system sending the position data of the mechanical contact to the activation device by a data communications system;
(b) the position data is transmitted by the activation device to a storage medium of the fire alarm by a data communications system;
(c) a test message of the fire alarm to a control center is triggered by an operator by the activation device, the test message including a unique identification number of the fire alarm and the position data of the fire alarm. In this embodiment, manual marking of the installation position of the fire alarm in a plan of the communications device can be dispensed with. That too increases the input reliability with regard to the position data. The action exerted by the activation device on the fire alarm can be realized e.g. by a mechanical contact of the activation device (e.g. the operator actuates a switch or button on the fire alarm by a bar) with the fire alarm. However, the activation device can also act on the fire alarm e.g. by way of a magnetic field, or through induction. In these embodiments the activation device and the fire alarm are equipped with corresponding electrotechnical means (e.g. induction coil).

In addition, the method for automatically locating a fire alarm, in particular in a building may include:
(a) a test message of the fire alarm to a control center is triggered by an operator, the test message including a unique identification number of the fire alarm;
(b) the position data of the fire alarm is transmitted to a control center by the operator by a mobile communications device, the position data of the fire alarm having been determined by a positioning system of the mobile communications device; and
(c) the identification number of the fire alarm is assigned to the position data of the fire alarm by the control center. In this case the identification number of the fire alarm is assigned to the position data of the fire alarm by of software in the control center. In this variant of the method, the mobile communications device requires no software for assigning the identification number to the position data of the fire alarm. This enables savings to be made in terms of resources (e.g. memory space, processor power) on the communications device.

A device for performing the method described above may include:
(a) an alarm generator triggering a test message of the fire alarm to a control center;
(b) a programmed processor determining the position data of the fire alarm; and
(c) a data communications system transmitting the position data and test messages. Examples of devices suitable for use as the mobile communications device are mobile telephones, smartphones, PDAs, notebooks or tablet PCs. A cellular telephone network (e.g. GSM, UMTS) or WLAN, for example, can be used as the communications link for data transmission.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
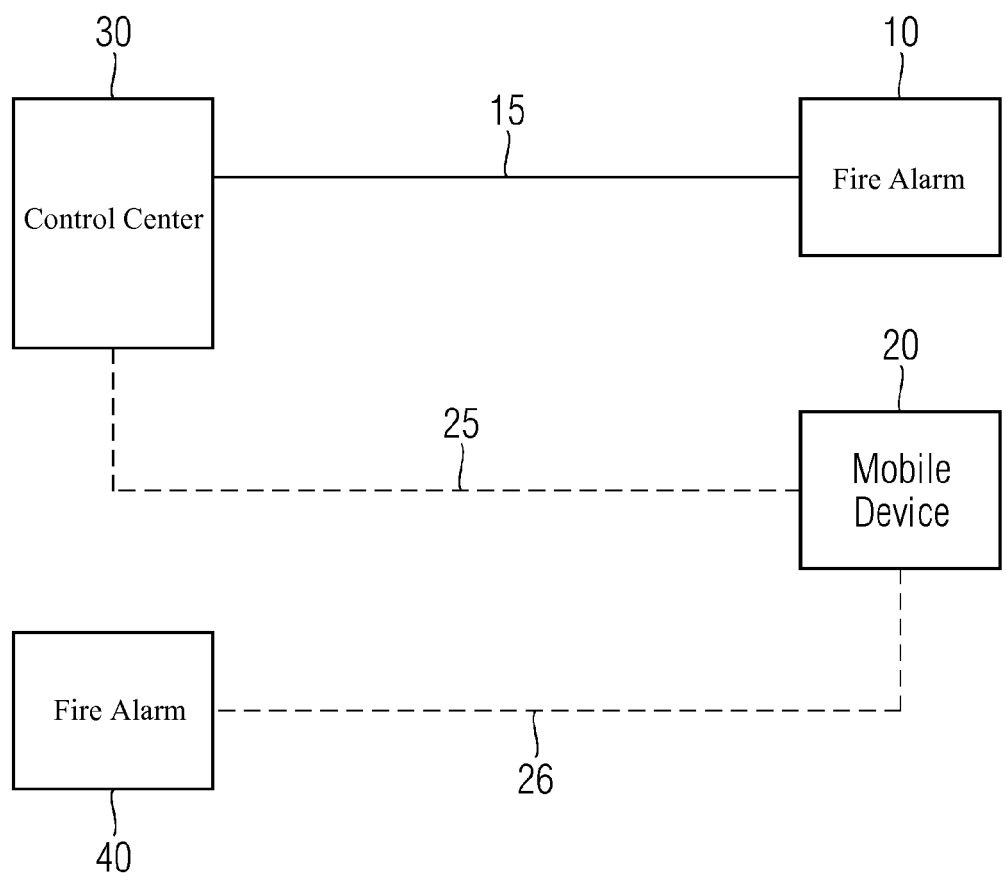
FIG. 1 is a block diagram of a first exemplary embodiment.

Reference will now be made in detail to the preferred embodiments, examples of which are illustrated in the accompanying drawings, wherein like reference numerals refer to like elements throughout.

The method enables automatic localization of a fire alarm at the time of its installation and at the same time avoiding the laborious and error-prone input of the identification number and location description.

FIG. 1 shows a first exemplary embodiment. An engineer (operator) wishes to install a fire alarm 10 which is connected via a line 15 to a control center 30. For this purpose the engineer is equipped with a mobile communications device 20. This can be e.g. a mobile telephone, a smartphone, a PDA (Personal Digital Assistant), a notebook or a tablet PC. The mobile communications device 20 can communicate with the control center 30 over a communications link 25 (for example a cellular telephone network (e.g. GSM, UMTS) or WLAN). An application (program) that is able to display to the engineer the floor plans (22, FIG. 2) of the building in which he is to install the fire alarms 10 runs on the communications device 20. A fire alarm 10 can have a storage medium (e.g. flash EEPROM or digital memory chip on which e.g. the identification number of the fire alarm can be stored).

The floor plans (22, FIG. 2) are provided with geographical reference data, enabling the application in the communications device 20 to determine the coordinates for each point in the plan. The coordinates can be specified for example in degrees of longitude and latitude, e.g. according to WGS84, or as an x/y value describing the distance in meters from an arbitrarily chosen point of the building or premises. In addition, the floor number or number of meters above reference level is also known for each floor plan (22, FIG. 2). A room name or room number can also be assigned to each geographical position, e.g. "building 53, 3rd floor, room 53-318" by known algorithms (assignment methods). It is of no importance here whether the floor plans (22, FIG. 2) are stored locally on the mobile communications device 20 or are loaded as necessary via a communications link 26 from a server 40 (e.g. from an internet server over an internet connection).

The engineer wanting to install a fire alarm 10 on a particular floor of the building calls up the corresponding floor plan (22, FIG. 2) so that he can view it on the display (21, FIG. 2) of his communications device 20 and selects the displayed section so that the room in which he wants to install the fire alarm 10 is visible. In the displayed floor plan (22, FIG. 2), the engineer B marks the point (23, FIG. 2) at which he will install the fire alarm 10. This can be effected in different ways, depending on the communications device 20 used: with a conventional mobile telephone, using the navigation keys; on a PDA, with the aid of the stylus; on a notebook, using the mouse or the touchpad; and on a state-of-the-art tablet PC, by tapping with his finger. He then installs the fire alarm 10 e.g. on the ceiling and connects it to the cable 15 via which the alarm message is to be sent to the control center 30. Once the installation has been completed, the engineer tests the connection to the control center 30. In so doing he triggers a test alarm, e.g. by pressing a corresponding button on the fire alarm 10 or by simulating smoke generation. This causes the fire alarm 10 to send a signal to the control center 30. The identification number of the fire alarm is also included in this signal.

Almost simultaneously, the engineer also presses a specific button 24 in the application on his communications device 20. This can be a real button (24, FIG. 2) on the device or a virtual button shown on the display (21, FIG. 2), which he actuates using a mouse, stylus or finger. Via the communications link 25, the application thereupon asks the control center which alarm messages have been received from fire alarms in the last e.g. three seconds.

If only one test alarm message has arrived, this can be uniquely assigned to the installed fire alarm 10. The control center software then sends the identification number also delivered in the test alarm back to the application on the mobile communications system 20 via the communications link 25 (e.g. a wireless connection). The application can now uniquely assign the identification number of the fire alarm 10 to a position, namely to the geographical data of the point in the floor map (22, FIG. 2) previously marked by the engineer B.

If, on the other hand, more than one test alarm message has arrived in the control center 30 from different fire alarms 10 within a defined time interval (e.g. in the last 3 seconds) —because e.g. a number of engineers are simultaneously engaged in installing fire alarms 10—, the engineer receives a corresponding message and is prompted to resend the test alarm.

If the engineer made a slight mistake when marking the installation site, he can still shift the marked point (23, FIG. 2) subsequently. The position assigned to the fire alarm 10 will be changed accordingly.

The application transfers the assignment of the fire alarm identification number to a geographical position into the database of the building management system either immediately or during a subsequent data synchronization so that in the event of a fire alarm the control center 30 will then know at all times at which geographical position the alarm was triggered—and hence in which building, on which floor, and in which room.

Figure 2:
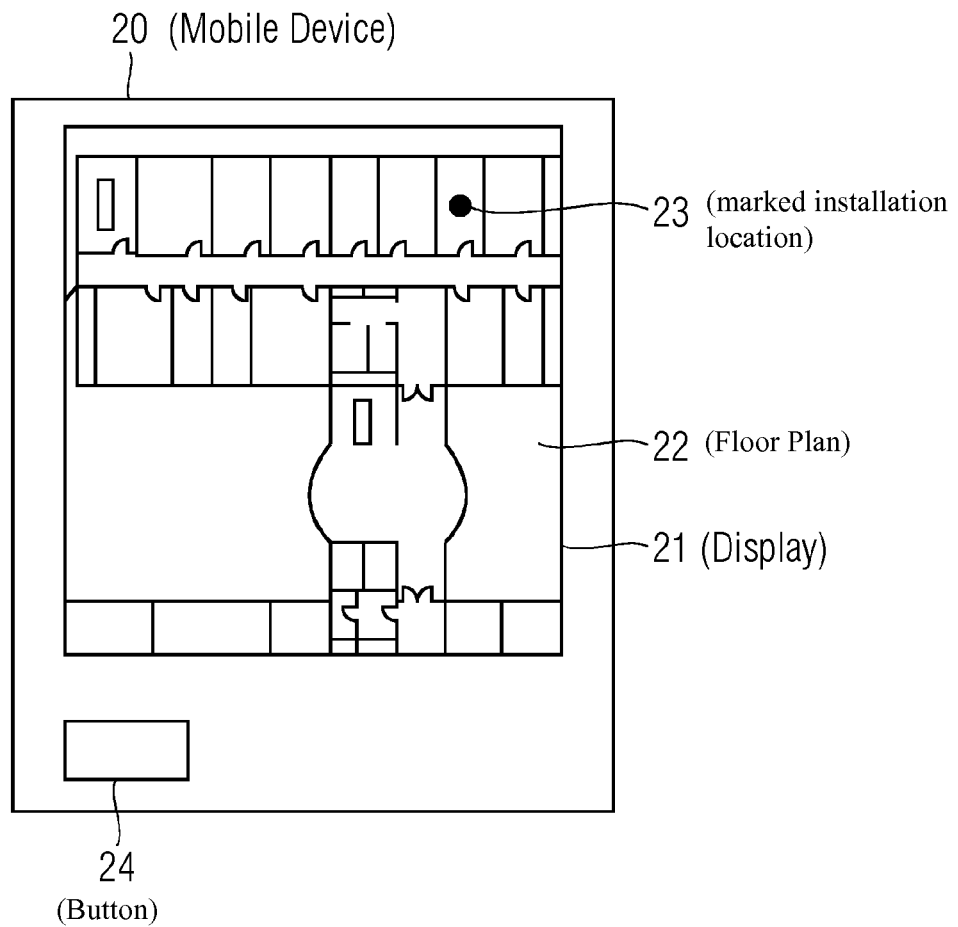
FIG. 2 is an exemplary schematic diagram of a mobile communications device.

FIG. 2 shows an exemplary schematic diagram of a mobile communications device 20. The communications device 20 can be e.g. a mobile telephone, a smartphone, a PDA (Personal Digital Assistant), a notebook or a tablet PC. The mobile communications device 20 can communicate with a control center via a communications link (for example cellular telephone network (e.g. GSM, UMTS) or WLAN). An application (software program, firmware) that is able to display to an engineer the floor plans 22 of the building in which the engineer is to install the fire alarms runs on the communications device 20. Using a triggering mechanism (e.g. a button 24 on the communications device 20), the operator instructs the control center to send to the communications device 20 the test messages that have been present for a defined time period (e.g. 3 seconds) at the control center. The communications device 20 also includes a display 21 that is provided, among other things, for displaying the floor plan 22 or the installation location 23 of a fire alarm. In addition, the communications device 20 can include an integrated positioning system (e.g. GPS).

Figure 3:
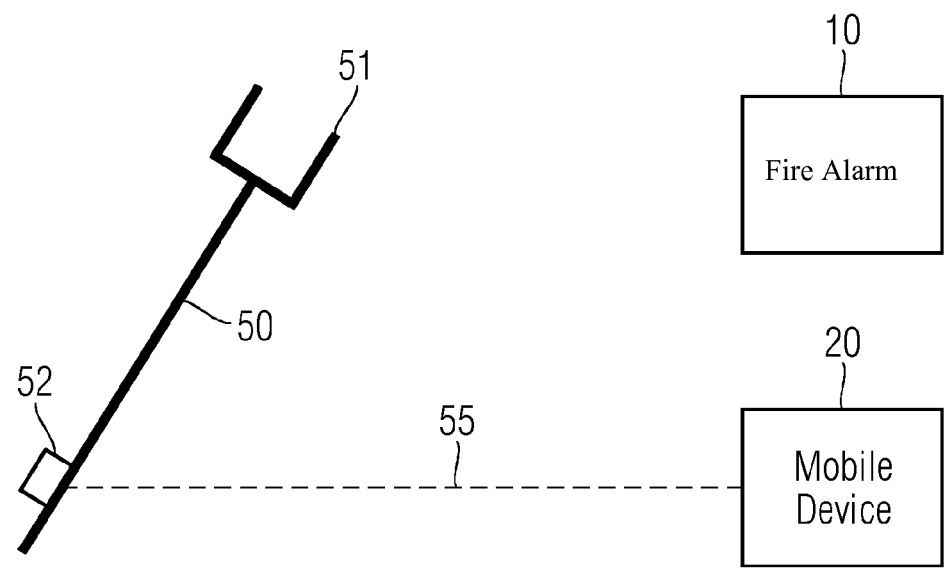
FIG. 3 is a schematic diagram of a second exemplary embodiment.

FIG. 3 shows a second exemplary embodiment. In this embodiment, the triggering of the test alarm and the pressing of a button (24, FIG. 2) on the communications device 20 can be combined into a single action. Usually the test alarm is triggered by way of a long bar 50 having a head 51 (hood) at the top end which is placed over the installed fire alarm 10. A button 52 is pressed at the bottom end of the bar, which button 52 then, by way of a corresponding mechanism or electronic circuit in the bar head 51, causes the fire alarm 10 to trigger the alarm. An electronic circuit which possesses a hardwired or wireless connection 55 (e.g. Bluetooth) to the mobile communications device 20 is now connected to the button 52 (a different triggering mechanism can also be used) at the bottom end of the bar. When the button 52 on the communications device 20 is pressed, an event is triggered via the connection 55, as a result of which the communications device 20 asks the control system (30, FIG. 1) for the test alarm message that has just been received.

Figure 4:
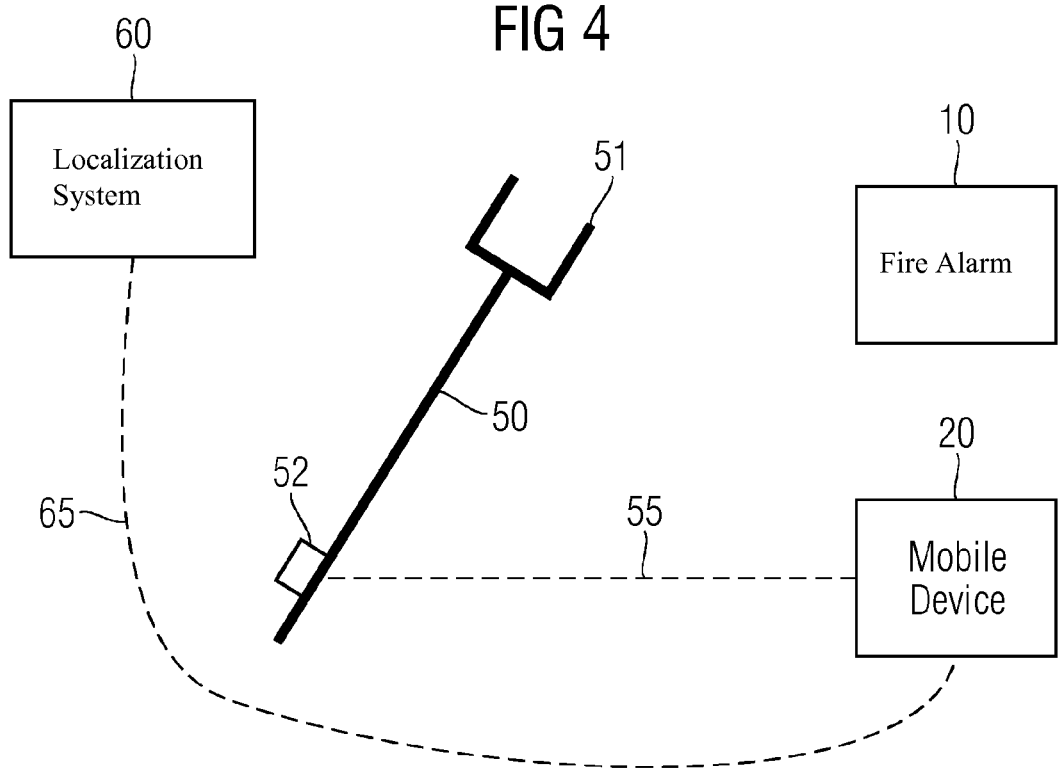
FIG. 4 is a schematic diagram of a third exemplary embodiment.

FIG. 4 shows a third exemplary embodiment. In a further exemplary embodiment it is possible to dispense with the manual marking of the installation position. The building is equipped with a localization system 60 which enables a 3D localization in the building with an accuracy of approx. 1 meter. The localization system 60 can be e.g. an RTLS (Real-Time Location System). The localization system 60 can be based e.g. on GPS, WLAN or RFID technology.

An electronic circuit is then contained in the head (hood) 51 of the bar 50 used for triggering the test alarm, the position of the electronic circuit being determined by the localization system 60 simultaneously with the triggering of the test alarm. The position thus determined is passed via a further communications link 65 (e.g. a wireless radio connection) to the mobile communications system 20, which from the information determines the assignment of fire alarm to position, as described above, through communication with the control center (30, FIG. 1).

Figure 5:
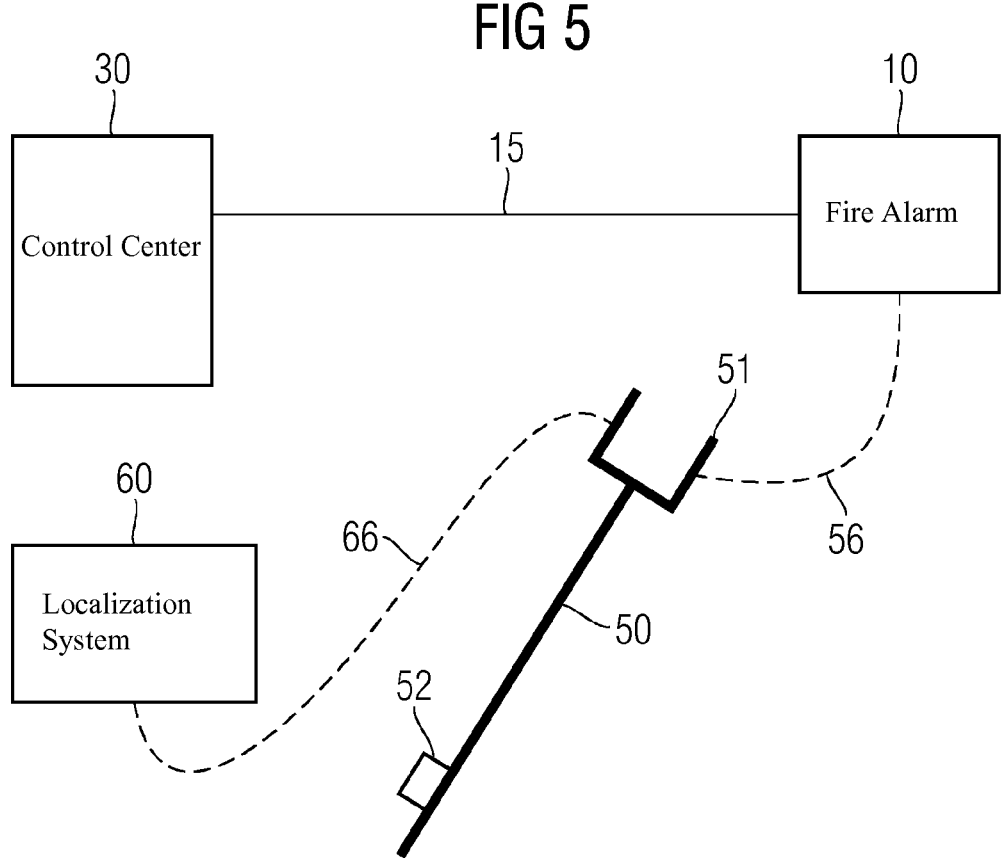
FIG. 5 is a schematic diagram of a fourth exemplary embodiment.

FIG. 5 shows a fourth exemplary embodiment. The mobile communications device can be dispensed with in this embodiment. The building is equipped with a localization system 60 which enables a 3D localization in the building with an accuracy of approx. 1 meter. In the head 51 of the bar 50 used for triggering the test alarm there is contained an electronic circuit whose position can be determined by the localization system 60. When the engineer presses the button 52 on the bar in order to trigger the test alarm, the electronic circuit in the bar 50 (the bar can be partially hollow, and the electronic circuit (e.g. microchip) can be accommodated in the cavity) first retrieves the position of the head 51 from the localization system 60 via the communications link 66. The electronic circuit in the head of the bar transmits the determined position to the fire alarm (e.g. wirelessly by Bluetooth or ZigBee 56) and the fire alarm relays this position information in the test alarm signal together with its identification number to the control center 30. Since both identification number and position are transmitted in one signal, this assignment is always unique, even when a number of engineers are installing and locating fire alarms simultaneously.

In another variant, the assignment of fire alarm identification number and installation location is managed by the control center software and not by the application on the mobile communications device. Toward that end, after the triggering of the test alarm, the communications device transmits the position of the fire alarm—regardless of whether the position has been determined by marking in the map or by the localization system—to the control center instead of requesting from the latter the identification number of the fire alarm to have reported most recently.

By using automatic assignment of the installation location (position) of the fire alarm to its identification number, a manual, and hence error-prone, input of the identification number is no longer necessary. The same applies to the specification of the room number or, as the case may be, the textual description of the installation position in the room (e.g. "3rd fire alarm, counting from the window on the west side"). The installation location is accordingly described more accurately and reliably than in the case of the present solution. Errors when entering the identification number can no longer occur. The amount of time and effort expended for installing and locating the fire alarm is considerably reduced. There is no need for the data recorded on paper to be transferred subsequently into the building management system.

The methods and device described above automatically locate a fire alarm in a building through automatic data synchronization of the identification number and the positioning data of the fire alarm either in a control center or a mobile communications device of an operator. Because no manual entries are required, input errors are avoided.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for automatically locating a fire alarm, in particular in a building, the method comprising:
    receiving an indication of a position at which the fire alarm is installed using an input and a display of a plan on a mobile communication device;
    triggering a test message of the fire alarm to a control center, the test message including a unique identification number of the fire alarm;
    receiving an instruction at the control center from the mobile communication device to send each test message received at the control center within a predefined period of time to the mobile communication device;
    assigning, if precisely one test message is returned by the control center, the unique identification number contained in the test message for the position of the fire alarm in the plan displayed on the mobile communication device assigned using the at least one input device;
    triggering a new test message of the fire alarm to the control center, if more than one test message is returned; and
    storing the assignment of the unique identification number of the fire alarm together with the position in a building management system.

2. The method as claimed in claim 1, further comprising sending instruction to the control center in response to by a single action of an operator that also triggers the test message.

3. The method as claimed in claim 2, further comprising activating a localization system to determine the position of the fire alarm and communicate the position to the mobile communication device in response to by the single action of an operator that also triggers the test message.

4. The method as claimed in claim 1, wherein said triggering of the test message includes activating a localization system to determine the position of the fire alarm and communicate the position to the mobile communication device.

5. A method for automatically locating a fire alarm in a building equipped with a localization system, comprising:
    activating the localization system by an activation device as a result of activation of a fire alarm by an operator;
    sending position data of a mechanical contact from the localization system to the activation device by a first data communications system;
    transmitting the position data from the activation device to a storage medium of the fire alarm by a second data communications system; and
    triggering, by an operator, a test message of the fire alarm to a control center by the activation device, the test message including a unique identification number of the fire alarm and the position data of the fire alarm.

6. A method for automatically locating a fire alarm in a building, comprising:
    triggering a test message of the fire alarm to a control center an operator, the test message including a unique identification number of the fire alarm;
    determining position data of the fire alarm by a positioning system of a mobile communication device;
    transmitting the position data of the fire alarm to a control center by the mobile communication device; and
    the identification number of the fire alarm is assigned to the position data of the fire alarm by the control center.

7. A device for automatically locating a fire alarm in a building, comprising:
    an alarm generator triggering a test message of the fire alarm to a control center;
    a programmed processor determining position data of the fire alarm;
    a data communications system, coupled to the fire alarm and the programmed processor, transmitting the test message and the position data; and
    a storage, coupled to the data communications system, storing the position data of the fire alarm in association with an identifier of the fire alarm.

* * * * *